Feb. 14, 1967  T. H. OSTER  3,303,834
INTERNAL COMBUSTION ENGINE STARTING SYSTEM
Filed May 28, 1964
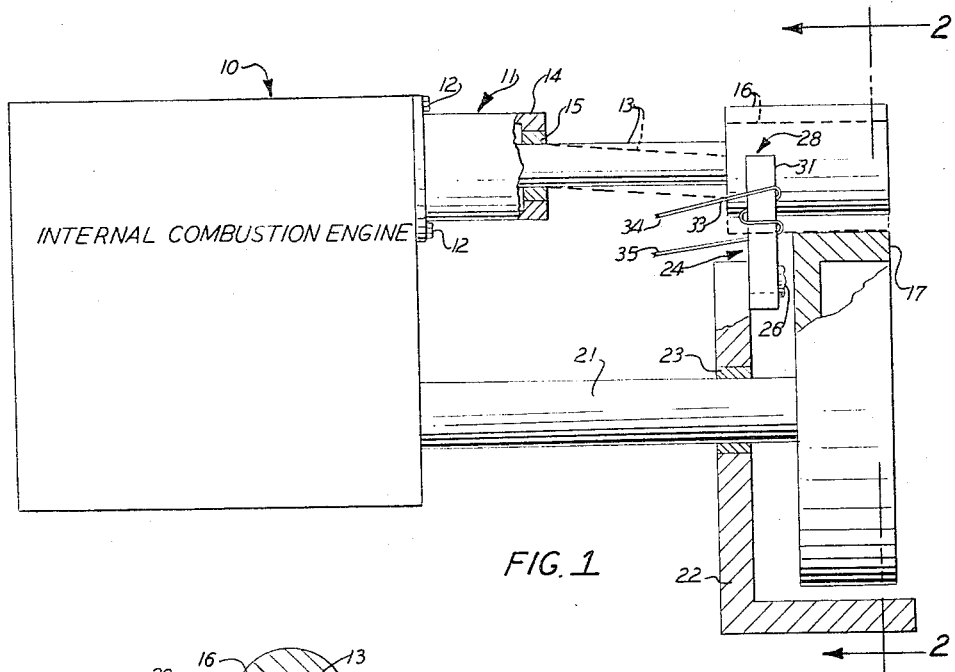
FIG. 1
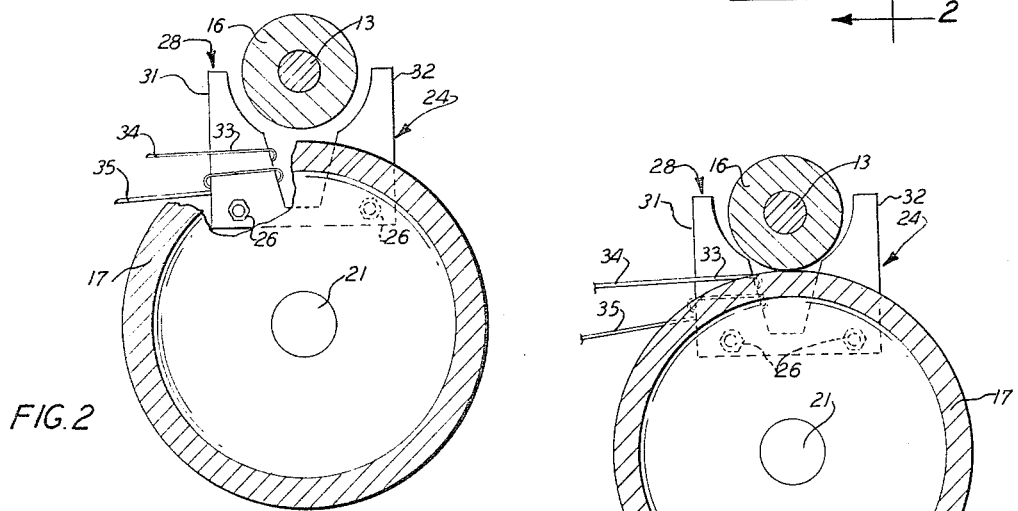
FIG. 2
FIG. 3
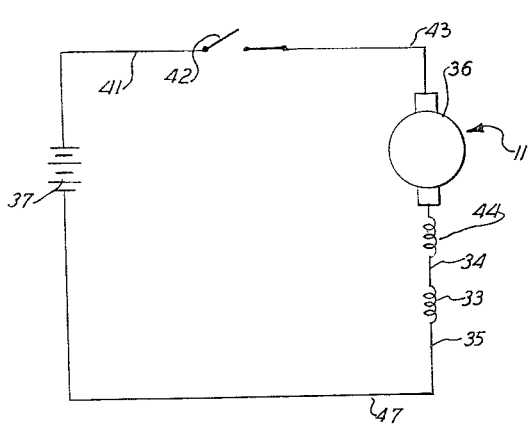
FIG. 4
THOMAS H. OSTER
INVENTOR
BY John R. Faulkner
Keith L. Zerschling
ATTORNEYS United States Patent Office 3,303,834
Patented Feb. 14, 1967

3,303,834
INTERNAL COMBUSTION ENGINE STARTING
SYSTEM
Thomas H. Oster, Dearborn, Mich., assignor to Ford
Motor Company, Dearborn, Mich., a corporation of
Delaware
Filed May 28, 1964, Ser. No. 370,933
6 Claims. (Cl. 123—179)

This invention relates to a friction type clutch and a method for establishing an interruptable driving connection between a driving member and a driven member and more particularly to such a clutch and process in which the driving connection is established by bending of a substantially rigid shaft of one of the members preferably by an electromagnetic means.

The invention is particularly useful in starting an internal combustion engine and when so employed provides an economical, simple, reliable and quiet apparatus for establishing a mechanical connection between the starting motor and the internal combustion engine before the internal combustion engine becomes self-propelled and for interrupting this mechanical connection when the internal combustion engine becomes self-propelled. This apparatus also provides for slippage between the starting motor and the internal combustion engine to protect the starting system from the stresses which are normally incident to a serious backfire and the consequent reverse torque.

The invention will be explained in connection with the drawing in which:

FIGURE 1 is a side elevational view, partly in section, of the invention;

FIGURE 2 is a sectional view taken along the lines 2—2 of FIGURE 1 and showing the starting system in the disengaged position;

FIGURE 3 is a view similar to FIGURE 2 except that it shows the starting system in the engaged position, and FIGURE 4 is a circuit diagram of the invention showing how the electromagnetic means for engaging the starter system is connected in circuit with the starter and source of electrical energy.

Referring now to FIGURE 1 of the drawing, there is shown in block diagram form an internal combustion engine 10 that has a conventional starter motor 11 rigidly affixed thereto by fastening means 12 as is conventional in internal combustion engines. The armature shaft 13 of the starter motor 11 is fixed radially within the frame 14 by means of a radial bearing 15.

A cylindrical friction driving member 16 of substantial length is affixed to the end of armature shaft 13. The cylindrical friction driving member 16 is positioned adjacent a friction driven member 17 that constitutes the rim of the flywheel of the internal combustion engine 10. The friction driven member 17 is connected to the crankshaft (not shown) of internal combustion engine 10 by means of a shaft 21. The friction driven member 17 has a housing 22 positioned around it that is generally supported by the internal combustion engine by conventional means not shown on the drawing. The shaft 21 is rotatably supported in this housing by a bearing 23 and by other bearings contained within the internal combustion engine 10. This housing 22 is open along a portion of its periphery for the reception of the cylindrical friction driving member 16.

The cylindrical friction driving member 16 is mounted in relation to the friction driven member or flywheel 17 so that normally there is a small amount of clearance between the two members when the starting system is in the disengaged position. This amount of clearance may be a few thousandths of an inch, and is shown in exaggerated form in the drawing for purposes of clarity.

An electromagnetic means 24 is mounted upon the housing 22 by fastening means 26. The electromagnetic means 24 may be more readily seen by referring to FIGURES 2 and 3. It comprises essentially a yoke 28 constructed of ferromagnetic material that has a first leg 31 and a second leg 32 the upper parts of which are arcuate sectors having essentially the same center as the cylindrical friction driving member 16. A winding 33 having leads 34 and 35 is positioned about one leg 31 of the yoke 28. In the circuit diagram of FIGURE 4, there is shown a source of electrical energy 37 connected to one terminal of the armature 36 of the starting motor 11 through lead 41, switch 42 and lead 43. This starter motor may be of the series wound type having a series field coil 44 connected in series with the armature 11. The winding 33 of the electromagnetic means 24 is connected in series with the armature 36 of the starting motor 11 and the field winding 44 through the lead 34 and with the battery 37 through the lead 35 and a lead 47.

The electromagnetic means 24 must be capable of exerting sufficient force upon the cylindrical friction driving member 16 to flex or bend the armature shaft 13 of the starting motor 11 about the bearing 15 sufficiently to establish contact between the cylindrical friction driving member 16 and the friction driven member 17. The force exerted by the electromagnetic means 24 must also be sufficient to force the friction driving member 16 against the friction driven member to transmit the required torque.

It can be readily appreciated that, as mounted, the cylindrical friction driving member 16 forms a portion of the electromagnetic circuit of the electromagnetic means 24. When the coil 33 is energized, the cylindrical friction driving member 16 will be moved from the disengaged position shown in FIGURE 2 into engagement with the friction driven member 17 as shown in FIGURE 3 since it will be moved in a direction to shorten the air gap between the cylindrical friction driving member 16 and the arcuate sectors of the legs 31 and 32 of the yoke 28.

As can be appreciated in FIGURE 1, the shaft 13 is rigidly supported radially by the bearing 15 mounted in the housing 14 of the starter motor 11, and the starter motor frame is rigidly supported or connected to the internal combustion engine 10. Thus, the shaft 13 must flex, as shown in the dotted lines, about the bearing 15 as the electromagnetic means 24 is energized and the friction driving member 16 comes into engagement with the friction driven member 17.

When the starter motor 11 is energized by the closing of the switch 42, the energization of the winding 33 of the electromagnetic means 24 will be accomplished. The energization of these two components will result in the shaft 13 of the starting motor 11 being flexed about bearing 15 and the friction driving member 16 forced firmly into contact with the friction driven member 17 before the starting motor 11 has had an opportunity to rotate significantly. Frictional forces will cause the starting motor to rotate the driven friction member and hence the engine until the engine begins to rotate under its own power.

At this stage, the current through the starter motor 11 and through the electromagnetic means 24 (winding 33) will have diminished to a point that the armature shaft 13 acting as a spring will disengage the friction driving member 16 and the friction driven member 17. It is to be observed that the torque exerted by the starting motor 11 is proportional to the square of the starting current, while the force exerted by the electromagnetic means 24 varies only as the first power of the starting current. This fact ensures that any current which is sufficient to prevent slippage between the friction driving member 16 and the friction driven member 17 at standstill will be adequate to prevent slippage until the internal combustion engine actually starts.

The amount of torque which can be transmitted by direct metal-to-metal friction under high pressure is remarkably large. The kinetic coefficient of friction of steel upon steel in the unlubricated condition approaches the value of 0.5. This coefficient of friction increases sharply as the pressure between the surfaces increases and static conditions are approximated. In practical applications it is necessary that the thrust of the friction driving member 16 against the friction driven member 17 be sufficiently intense to rupture any chance lubricating film of water or stray lubricant which may be present. The friction driving member 16 should be made of a harder grade of steel than the friction driven member 17 to cause the wear to be spread over the large area of the friction driven member.

The invention has been particularly described in relation to starting an internal combustion engine in which the armature shaft of the starter motor is substantially rigid. It is apparent, however, that it may be employed in other applications where a friction driving connection is desired between a driven and a driving member and these members are mounted on substantially rigid shafts.

It is to be understood that this invention is not to be limited to the exact construction shown and described but that various changes and modifications may be made without departing from the spirit and scope of the invention as defined in the appended claims.

I claim:

1. An internal combustion engine starting system comprising a starting motor, a friction driving member mounted upon the shaft of the starting motor, a friction driven member associated with the internal combustion engine and slightly removed from the friction driving member and means mounted in a stationary position with respect to said friction driven member and adjacent the shaft for bending the shaft of the starting motor to bring the friction driving member into contact with the friction driven member.

2. An internal combustion engine starting system comprising a starting motor having a shaft member, a friction driving member mounted upon said shaft member, one of said members having means constructed of a ferromagnetic material, a friction driven member associated with the internal combustion engine and slightly removed from the friction driving member and electromagnetically impelled means fixedly mounted adjacent said means constructed of ferromagnetic material for bending the shaft of the starting motor to bring the friction driving member into contact with the friction driven member.

3. An internal combustion engine starting system comprising a starting motor having a shaft member, a friction driven member mounted upon said shaft member, one of said members including means constructed of ferromagnetic material, a friction driving member associated with the internal combustion engine and slightly removed from the friction driven member and electromagnetically impelled means fixedly mounted adjacent said means constructed of ferromagnetic material for bending the shaft of the starting motor to bring the friction driving member into contact with the friction driven member, said electromagnetic means being connected in series with the starting motor.

4. A friction clutch comprising a friction driving member, a substantially rigid shaft supporting said friction driving member, a friction driven member associated with and slightly removed from said friction driving member, and means fixedly mounted with respect to said friction driven member and adjacent said substantially rigid shaft for bending said substantially rigid shaft sufficiently to bring said friction driving member into engagement with said friction driven member.

5. A friction type clutch comprising a friction driving member, a friction driven member associated with and slightly removed from said friction driving member, a rigid shaft rotatably supporting one of said members, and means fixedly mounted with respect to the other of said members and adjacent said rigid shaft for bending said rigid shaft to bring said friction driving member and said friction driven member into engagement.

6. The combination of claim 5 in which said last mentioned means is an electromagnetic means and a source of electrical energy is provided that is adapted to be connected to said electromagnetic means.

References Cited by the Examiner

UNITED STATES PATENTS

| | | | |
|---|---|---|---|
| 842,627 | 1/1907 | Coleman | 74—210 X |
| 1,185,931 | 6/1916 | Peters | 290—36 |
| 1,882,022 | 10/1932 | Leyvastre | 123—179 |
| 2,461,174 | 2/1949 | Peterman | 230—14 |

OTHER REFERENCES

1961 Pontiac Tempest Chassis and Body Shop Manual, pages 4-3 and 4-4.

MARK NEWMAN, *Primary Examiner.*

RICHARD B. WILKINSON, *Examiner.*

L. M. GOODRIDGE, *Assistant Examiner.*